(12) United States Patent
Muyzert et al.

(10) Patent No.: US 9,110,187 B2
(45) Date of Patent: *Aug. 18, 2015

(54) SENSOR ASSEMBLY HAVING A SEISMIC SENSOR AND A DIVERGENCE SENSOR

(75) Inventors: Everhard Muyzert, Girton (GB); Pascal Edme, Cambridge (GB)

(73) Assignee: WESTERNGECO L.L.C., Houston, TX (US)

( * ) Notice: Subject to any disclaimer, the term of this patent is extended or adjusted under 35 U.S.C. 154(b) by 749 days.

This patent is subject to a terminal disclaimer.

(21) Appl. No.: 12/573,301

(22) Filed: Oct. 5, 2009

(65) Prior Publication Data

US 2011/0080808 A1 Apr. 7, 2011

(51) Int. Cl.
| | | |
|---|---|---|
| *G01V 1/36* | (2006.01) | |
| *G01V 1/20* | (2006.01) | |
| G01V 1/16 | (2006.01) | |
| G01V 1/18 | (2006.01) | |

(52) U.S. Cl.
CPC ... *G01V 1/20* (2013.01); *G01V 1/16* (2013.01); *G01V 1/189* (2013.01)

(58) Field of Classification Search
CPC ....... G01V 1/20; G01V 1/3808; G01V 1/189; G01V 1/364; B06B 1/0603
USPC ............ 38/45; 174/101.5; 181/112, 401, 402; 220/530, 723; 222/94; 264/45.3; 367/25, 43, 149, 154, 38, 40, 41, 45, 367/58, 160; 310/331, 337
See application file for complete search history.

(56) References Cited

U.S. PATENT DOCUMENTS

| | | | | |
|---|---|---|---|---|
| 3,722,751 | A | * | 3/1973 | Bisciglia .......................... 222/94 |
| 3,934,218 | A | | 1/1976 | Babb |
| 4,134,097 | A | | 1/1979 | Cowles |
| 4,163,206 | A | * | 7/1979 | Hall, Jr. ......................... 367/160 |
| 4,334,296 | A | | 6/1982 | Hall, Jr. |
| 4,520,467 | A | | 5/1985 | Berni |
| 4,554,648 | A | | 11/1985 | Greer |
| 4,558,439 | A | | 12/1985 | Gudesen |
| 4,599,713 | A | | 7/1986 | Rudaz |
| 4,890,264 | A | * | 12/1989 | Crews et al. .................... 367/45 |
| 4,979,150 | A | | 12/1990 | Barr |
| 4,996,675 | A | | 2/1991 | Beauducel |
| 5,555,530 | A | | 9/1996 | Meehan |
| 5,621,699 | A | | 4/1997 | Rigsby et al. |

(Continued)

FOREIGN PATENT DOCUMENTS

| | | | | |
|---|---|---|---|---|
| EP | | 0736781 A1 | * 10/1996 | ............... G01V 1/18 |
| EP | | 1454169 | 10/1996 | |

(Continued)

OTHER PUBLICATIONS

PCT Search Report, dated Apr. 28, 2011, Application No. PCT/US2010/051368.

(Continued)

*Primary Examiner* — Daniel L Murphy

(57) ABSTRACT

A sensor assembly having improved characteristics for use in surveying a subterranean structure includes a divergence sensor for positioning at or below a ground surface, where the divergence sensor includes a container containing a material and a pressure sensor immersed in the material. In addition, the sensor assembly includes a single-component seismic sensor that is external to the container of the divergence sensor.

32 Claims, 4 Drawing Sheets

(56) References Cited

U.S. PATENT DOCUMENTS

| | | | |
|---|---|---|---|
| 5,648,938 A | 7/1997 | Jakubowicz | |
| 5,757,720 A | 5/1998 | Soubaras | |
| 6,314,371 B1 | 11/2001 | Monk | |
| 6,330,512 B1 | 12/2001 | Thomas et al. | |
| 6,381,544 B1 | 4/2002 | Sallas et al. | |
| 6,442,304 B1 | 8/2002 | Crawley et al. | |
| 6,446,009 B1 | 9/2002 | Baeten | |
| 6,584,038 B2 * | 6/2003 | Meunier | 367/25 |
| 6,607,050 B2 | 8/2003 | He et al. | |
| 6,894,948 B2 | 5/2005 | Brittan et al. | |
| 6,932,185 B2 | 8/2005 | Bary et al. | |
| 6,961,283 B2 * | 11/2005 | Kappius et al. | 367/43 |
| 7,082,079 B2 * | 7/2006 | Woo | 367/149 |
| 7,142,481 B1 * | 11/2006 | Metzbower et al. | 367/154 |
| 7,286,938 B2 | 10/2007 | Amundsen et al. | |
| 7,551,517 B2 * | 6/2009 | Berg et al. | 367/149 |
| 7,916,576 B2 | 3/2011 | Beasley | |
| 8,520,469 B2 | 8/2013 | Ronnow et al. | |
| 8,712,694 B2 * | 4/2014 | Edme et al. | 702/17 |
| 2007/0104028 A1 | 5/2007 | Manen et al. | |
| 2008/0225641 A1 | 9/2008 | Manen et al. | |
| 2009/0052277 A1 | 2/2009 | Swanson | |
| 2010/0100330 A1 | 4/2010 | Burkholder | |
| 2010/0265797 A1 | 10/2010 | Robertsson et al. | |
| 2010/0286922 A1 | 11/2010 | Poletto | |
| 2011/0082646 A1 | 4/2011 | Halliday | |
| 2011/0082647 A1 | 4/2011 | Edme et al. | |
| 2011/0085417 A1 | 4/2011 | Ronnow et al. | |
| 2011/0141849 A1 | 6/2011 | Brittan | |
| 2012/0081999 A1 | 4/2012 | Halliday et al. | |

FOREIGN PATENT DOCUMENTS

| | | | |
|---|---|---|---|
| EP | 1257849 | 1/2009 | |
| FR | 2738642 | 3/1997 | |
| GB | 1256304 A * | 12/1971 | G01V 1/16 |
| GB | 2456313 | 7/2009 | |
| WO | 03036331 | 5/2003 | |
| WO | 2005017563 | 2/2005 | |

OTHER PUBLICATIONS

Barr, et al., Attenuation of Water-Column Reverberations Using Pressure and Velocity Detectors in a Water-Bottom Cable, SEG Annual International , 1989.

Barr, Dual-Sensor OBC Technology, The Leading Edge, Jan. 1997, pp. 45-51, vol. 16.

De Meersman, et al., A Complex SVD-Polarization Filter for Ground Roll Attenuation on Multi-Component Data, EAGE 67th Conference and Exhibition, Jun. 13-16, 2005.

Edme, et al., Receiver Function Method in Reflection Seismology, Geophysical Prospecting, 2008, pp. 327-340, vol. 56.

Edme, et al., Receiver Function Decomposition of OBC Data:Theory, Geophysical Journal International, 2009, pp. 966-977, vol. 177.

Karsli, et al. Using the Wiener-Levison Algorithm to Supress Ground Roll, Journal of Applied Geophysics, 2004, pp. 187-197, vol. 55.

Kragh, et al., Ground Roll and Polarization, First Break, Sep. 1995, pp. 369-378, vol. 13, No. 9.

Robertsson, et al., Wavefield Separation using Densely Deployed Three-Component Single-Sensor Groups in Land Surface-Seismic Recordings, Geophysics, Sep.-Oct. 2002, pp. 1624-1633, vol. 67, No. 5.

Drijkoningen, Design of Seismic Network in LOFAR: Testing at Exloo Test-Site, Jul. 2007.

Drijkoningen, Project Plan of the Seismic Application in LOFAR, Sep. 2007.

Van Dalen, et al., Characterization of Subsurface Parameter with Combined Fluid-Pressure and Particle-Velocity Measurements, EAGE, 2008.

Sensor Geophones, ION Geophysical, http://www.iongeo.com/Land_Imaging/Geophones, web-site, 2009.

Digital Sensors, ION Geophysical, http://www.iongeo.com/Land_Imaging/Digital_Sensors, web-site, 2009.

U.S. Appl. No. 12/573,266, Final Rejection dated Mar. 27, 2012, pp. 1-24 and attachment.

U.S. Appl. No. 12/573,266, Office Action dated Nov. 21, 2011, pp. 1-17 and attachment.

Criss, "Another look at full-wave seismic imaging," First Break, vol. 25, Jun. 2007 (8 pages).

Greensted, "The Lab Book Pages: Delay Sum Beamforming," Oct. 2012, The Lab Book Pages, pp. 1-7, http://www.labbookpages.co.uk/audio/beamforming/delaySum.html.

U.S. Appl. No. 12/573,266, Non-Final Rejection dated Apr. 25, 2013, pp. 1-20 and attachment.

U.S. Appl. No. 12/720,188, Notice of Allowance dated Apr. 24, 2013, pp. 1-6 and attachments.

U.S. Appl. No. 12/757,103, Notice of Allowance dated Apr. 26, 2013, pp. 1-3 and attachments.

Curtis et al., "Seismic interferometry-turning noise into signal", Sep. 2006, The Leading Edge, pp. 1082-1092 http://library.seg.org/doi/pdf/1 0.1190/1.2349814.

Snieder et al., "Extracting the Green's function of attenuating heterogeneous acoustic media from uncorrelated waves", May 2007, J. Acoust. Soc. Am. 121 (5), pp. 2637-2643, http://inside.mines.edu/-rsnieder/Interf_atten07.pdf.

Halliday et al., "Interferometric surface-wave isolation and removal", Sep.-Oct. 2007, Geophysics, vol. 72, No. 5, pp. A69-A73.

International Search Report and Written Opinion for PCT Application No. PCT/US2010/051367 (57-0926-PCT) dated Apr. 28, 2011: pp. 1-8.

International Search Report and Written Opinion for PCT Application No. PCT/US2011/060328 (570949WO) dated Jun. 11, 2012: pp. 1-8.

Curtis et al., "Seismic interferometry—turning noise into signal," The Leading Edge, Sep. 2006: pp. 1082-1092.

Dey et al., "Noise suppression on geophone data using microphone measurements," CREWES Research Report, 2000, vol. 12: pp. 1-12, <http://www.crews.org/ForOurSponsors/ResearchReports/2000/2000-08.pdf>.

Halliday et al., "Interferometric surface-wave isolation and removal," Geophysics, Sep.-Oct. 2007, vol. 72 (5): pp. A69-A73.

Snieder, "Extracting the Green's function of attenuating heterogeneous acoustic media from uncorrelated waves," J. Acoust. Soc. Am., May 2007, vol. 121(5): pp. 2637-2643.

Snieder et al., "Cancellation of spurious arrivals in Green's function extraction and the generalized optical theorem," Physical Review E, 2008, vol. 78: pp. 036606-1-036606-8.

Office Actions of File History of U.S. Appl. No. 12/573,266, dated Dec. 9, 2013, Oct. 1, 2013, and Jul. 15, 2013 (51 pages).

U.S. Appl. No. 12/573,266, Non-Final Office Action dated Oct. 11, 2012, pp. 1-19 and attachments.

Lawton et al., "Field tests of 3-component geophones, Part II," Crewes, 1991: pp. 1-27, <http://www.crewes.org/ForOurSponsors/Research Reports/1991/1991-01.pdf>.

* cited by examiner

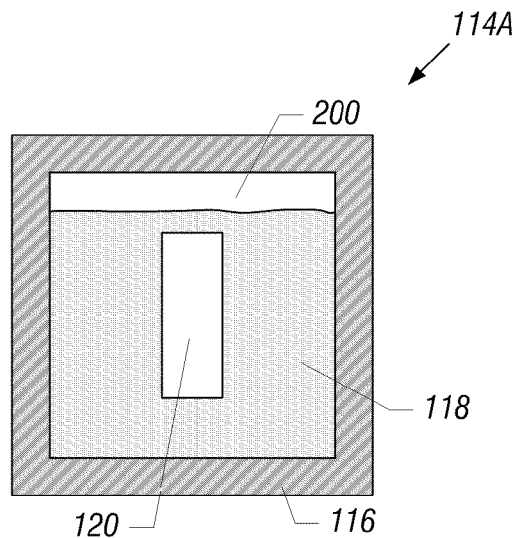
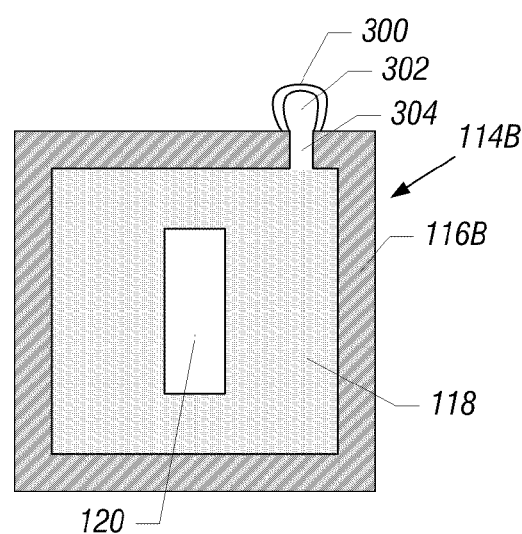
FIG. 2          FIG. 3
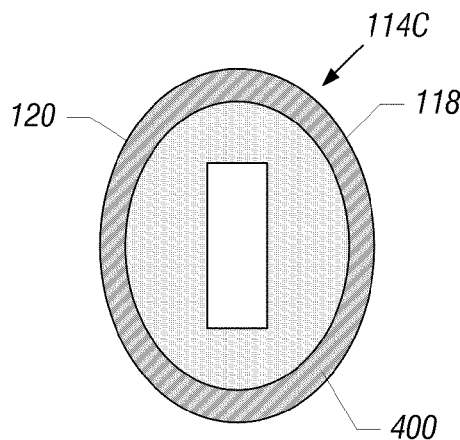
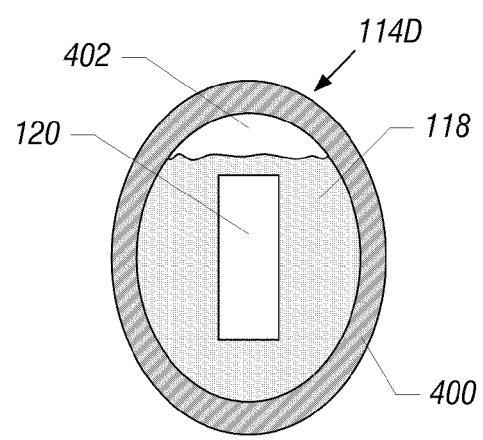
FIG. 4          FIG. 5

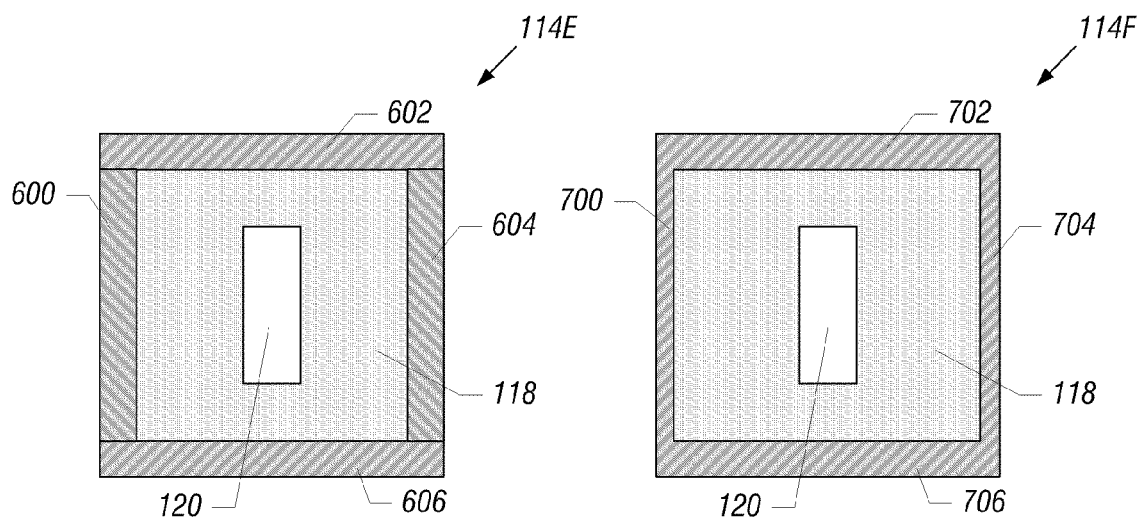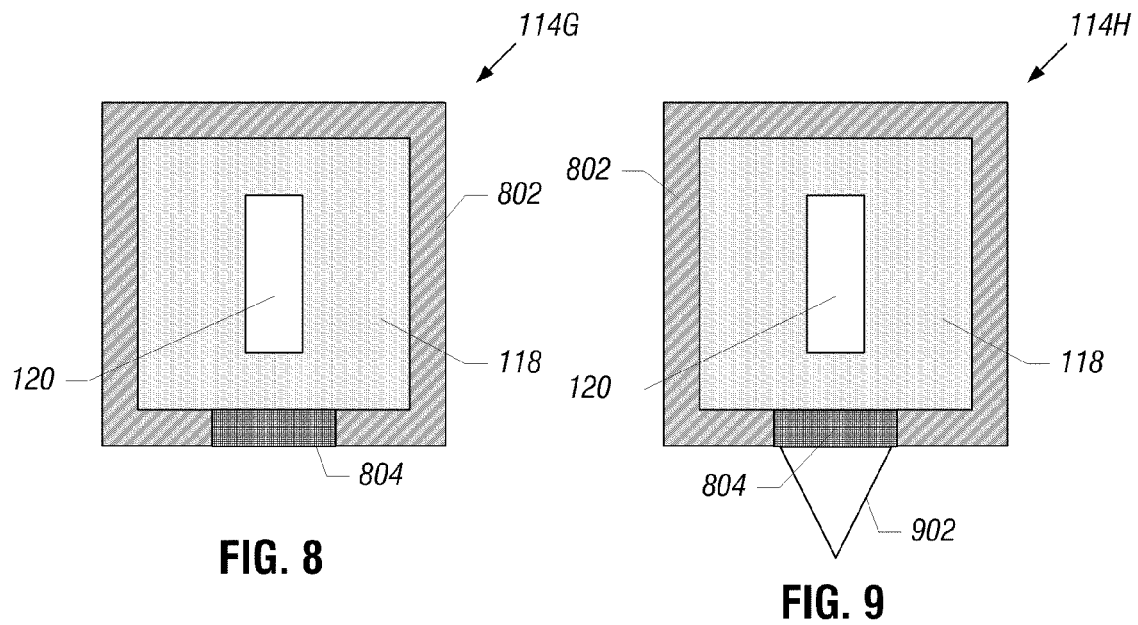

SENSOR ASSEMBLY HAVING A SEISMIC SENSOR AND A DIVERGENCE SENSOR

BACKGROUND

Seismic surveying is used for identifying subterranean elements, such as hydrocarbon reservoirs, freshwater aquifers, gas injection zones, and so forth. In seismic surveying, seismic sources are placed at various locations on a land surface or sea floor, with the seismic sources activated to generate seismic waves directed into a subterranean structure.

The seismic waves generated by a seismic source travel into the subterranean structure, with a portion of the seismic waves reflected back to the surface for receipt by seismic receivers (e.g., geophones, accelerometers, etc.). These seismic receivers produce signals that represent detected seismic waves. Signals from seismic receivers are processed to yield information about the content and characteristic of the subterranean structure.

Noise may interfere with accurate measurement of seismic waves reflected from the subterranean structure. Various techniques have been developed to reduce the effect of noise in seismic survey operations. Many of such techniques involve either complex arrangements of seismic receivers, or usage of relatively complex processing algorithms to remove the effects of noise, which can increase the cost associated with performing seismic surveys.

SUMMARY

In general, according to an embodiment, a sensor assembly having improved characteristics for use in surveying a subterranean structure includes a divergence sensor for positioning at or below a ground surface, where the divergence sensor includes a container containing a material and a pressure sensor immersed in the material. In addition, the sensor assembly includes a single-component seismic sensor that is external to the container of the divergence sensor.

Other or alternative features will become apparent from the following description, from the drawings, and from the claims.

BRIEF DESCRIPTION OF THE DRAWINGS

FIGS. 2 and 3 illustrate divergence sensors having containers that are generally cuboid shaped, in accordance with some embodiments;

FIGS. 4-5 illustrate divergence sensors having containers that are generally ellipsoid shaped, according to alternative embodiments;

FIGS. 6-9 illustrate divergence sensors having containers with sides formed of different stiffness, according to further embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
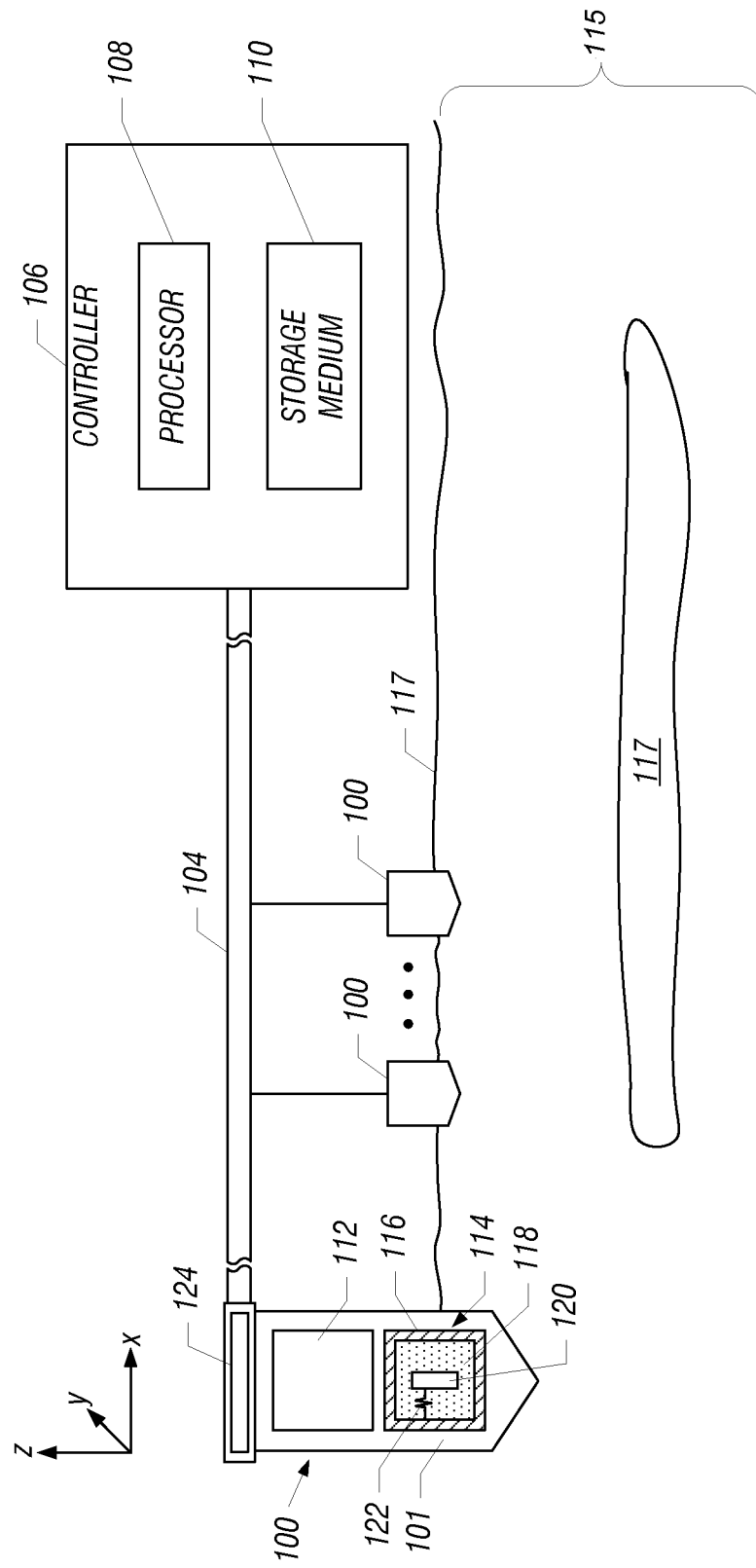
FIG. 1 is a schematic diagram of a sensor assembly according to an embodiment.

FIG. 1 shows an example arrangement for performing a seismic survey operation, which includes sensor assemblies 100 according to an embodiment. The sensor assemblies 100 depicted in FIG. 1 can be arranged in a line, or in an array, for performing a seismic survey operation with respect to a subterranean structure 115. The subterranean structure 115 may have at least one subterranean element 117 of interest, such as a hydrocarbon reservoir, a freshwater aquifer, a gas injection zone, and so forth.

The sensor assemblies 100 are coupled over an electrical cable 104 to a controller 106, which includes a processor 108 and a storage medium 110 for storing data received from the sensor assemblies 100. In an alternative embodiment, instead of using the cable 104, radio communications or other types of wireless communications can be performed between the sensor assemblies 100 and the controller 106. Although not shown in FIG. 1, routers or concentrators can be provided between the sensor assemblies 100 and the controller 106.

As shown in FIG. 1, each of some or all of the sensor assemblies 100 has both a seismic sensor 112 and a divergence sensor 114. The seismic sensor 112 can be a geophone for measuring the vertical particle velocity induced by seismic waves in a subterranean structure 115, or alternatively, the seismic sensor 112 can be an accelerometer for measuring acceleration induced by seismic waves propagated through the subterranean structure 115. Seismic sources (e.g., vibrators, air guns, explosive devices) are activated to propagate seismic waves into the subterranean structure 115. Alternatively, instead of using controlled seismic sources as listed above to provide controlled source or active surveys, some embodiments can also be used in the context of passive surveys. Passive surveys use the sensor assemblies 100 to perform one or more of the following: (micro)earthquake monitoring; hydro-frac monitoring where microearthquakes are observed due to rock failure caused by fluids that are actively injected into the subsurface, such as a hydrocarbon reservoir; and so forth.

In some embodiments, the seismic sensor 112 is a vertical component seismic sensor for measuring seismic waves in the vertical direction (represented by axis z in FIG. 1). In alternative embodiments, the sensor assembly 100 can additionally or alternatively include seismic sensors for detecting seismic waves in generally horizontal directions, such as the x or y directions that are generally parallel to a ground surface 117 in FIG. 1. The seismic sensor 112 is considered to be the main survey sensor for acquiring seismic data associated with surveying of the subterranean structure 115. In some implementations, the seismic sensor 112 is a single-component seismic sensor to measure a component of a seismic wavefield in just one direction, e.g., one of the x, y, and z directions. For example, the single-component seismic sensor 112 can measure the vertical component of displacement, velocity, or acceleration of the seismic wavefield. Alternatively, the single-component seismic sensor can measure a horizontal component of displacement, velocity, or acceleration of the seismic wavefield, or alternatively, the output that is derived based on the data from the seismic sensor includes a derived horizontal component of the displacement, velocity, or acceleration of the seismic wavefield.

The divergence sensor 114 that is also part of the sensor assembly 100 is used for measuring an input different from the seismic waves propagated through the subterranean structure 115 that are measured by the seismic sensor 112. One example of such an input is noise, such as horizontally propagating noise along the ground surface 117 (referred to as "ground-roll noise"). Ground-roll noise can be the result of horizontally traveling seismic waves from seismic sources that are propagated to the sensor assemblies 100 along the ground surface 117. Examples of ground-roll noise include Rayleigh waves, Love waves, or other types of signals.

Other types of noise include flexural waves present in data acquired over frozen surfaces such as a body of water or permafrost; and airborne noise caused by the environment such as due to wind, rain, or human activity such as traffic, air blasts, flare noise or other industrial processes.

The divergence sensor 114 has a closed container 116 that is sealed. The container 116 contains a volume of liquid 118 (or other material such as a gel, a solid such as plastic or sand, and so forth) inside the container 116. Moreover, the container 116 contains a pressure sensor 120 (e.g., a hydrophone) that is immersed in the liquid 118 (or other material). The pressure sensor 120 being immersed in the material 118 means that the pressure sensor 120 is surrounded by or otherwise attached to or in contact with the material 118. In the ensuing discussion, reference is made to the hydrophone 120 that is immersed in the liquid 118—note that in alternative embodiments, other types of pressure sensors 120 can be immersed in other types of material 118.

The hydrophone 120, which is neutrally buoyantly immersed in the liquid 118, is mechanically decoupled from the walls of the container 116. As a result, the hydrophone 120 is sensitive to just acoustic waves that are induced into the liquid 118 through the walls of the container 116. To maintain a fixed position, the hydrophone 120 is attached by a coupling mechanism 122 that dampens propagation of acoustic waves through the coupling mechanism 122. Examples of such a coupling mechanism 122 include elastic bands or a suitable arrangement of springs and/or dashpots, for example.

Examples of the liquid 118 include the following: kerosene, mineral oil, vegetable oil, silicone oil, and water. In other embodiments, other types of liquids can be employed. As yet another example, instead of a liquid, the hydrophone 120 is immersed in another type of material, such as gel, or a solid such as a plastic or sand. In one example, a liquid with a higher viscosity can be used to change the sensitivity to different types of waves, including P (compression) waves, S (shear) waves, Rayleigh waves, and Love waves. Moreover, the amount of liquid 118 provided in the container 116 of the divergence sensor 114 determines the sensitivity of the hydrophone 120. A container 116 that is only partially filled with liquid records a weaker signal.

As further shown in FIG. 1, the sensor assembly 100 also includes electronic circuitry 124 that is electrically coupled to both the seismic sensor 112 and the divergence sensor 114. The electronic circuitry 124 can include storage elements, processing elements, and communications elements for communicating data acquired by the seismic sensor 112 and divergence sensor 114 over the electrical cable 104 to the controller 106.

As depicted in FIG. 1, the seismic sensor 112 is positioned above and external to the container 116 of the divergence sensor 114. In other implementations, the seismic sensor 112 can have another arrangement with respect to the divergence sensor 114. At least a portion of the divergence sensor 114 is below the ground surface 117, such that the hydrophone 120 is at or below the ground surface 117, but not above the ground surface 117. When planted, the divergence sensor 114 of the sensor assembly 100 is firmly in contact with the earth medium underneath the ground surface 117, which improves data quality of signals acquired by the hydrophone 120 in the divergence sensor 114.

In embodiments that employ the cable 104, power is provided from a remote power supply (such as a power supply located at the controller 106) through the cable 104 to the sensor assemblies 100. In embodiments that employ wireless communications and that do not use the cable 104, the sensor assembly 100 can be provided with batteries to provide local power.

FIG. 2 illustrates an example of a divergence sensor 114A that has a container 116 partially filled with the liquid 118 (in contrast with FIG. 1, which depicts a container 116 that is completely filled with liquid 118). As a result of partially filling the container 116 with liquid 118, an expansion volume 200 is provided above the liquid 118 inside the container 116, where the expansion volume 200 is filled with a gas. The expansion volume 200 allows for expansion of the liquid 118 as the temperature of the liquid 118 rises. In some implementations, a goal is to avoid having more than 20% by volume of gas or vacuum inside the container 116. Providing more than 20% by volume of gas or vacuum may cause signals acquired by the hydrophone 120 to be too weak. Alternatively, in other implementations, the goal may be to avoid having more than some other percentage by volume of gas or vacuum inside the container 116.

FIG. 3 shows an alternative embodiment, in which the container 116 of a divergence sensor 114B is completely filled with the liquid 118. However, in FIG. 3, an expansion volume is provided by attaching a bubble structure 300 to the upper part of the container 116B of the divergence sensor 114B. The bubble structure 300 includes an internal volume 302 and a port 304 that is in fluid communication with the inside of the container 116B. Expansion of the liquid 118 inside the container 116B (such as caused by a temperature rise) will cause a portion of the liquid 118 to enter the inner chamber 302 of the bubble structure 300 through the port 304 between the container 116B and the chamber 302.

Although FIGS. 2 and 3 illustrate two ways of providing an expansion volume to accommodate expansion of the liquid 118, it is noted that other implementations can employ other mechanisms for providing an expansion volume that is in fluid communication with the liquid 118.

FIGS. 1-3 show implementations in which the containers 116, 116B are generally cuboid in shape. A cuboid generally has rectangular sides. In a specific implementation, a cuboid can have square sides. In other implementations, the container of a divergence sensor can have other shapes, including a parallelepiped shape, a pyramid shape, a quadrilateral frustum shape, a dipyramid shape, or other more complex shapes.

FIGS. 4 and 5 show divergence sensors 114C and 114D, respectively, that include a container 400 that is generally of an ellipsoid shape. Alternatively, the container 400 can have a spherical shape. The ellipsoid container 400 in FIG. 4 contains the liquid 118 that completely fills the inner chamber of the ellipsoid container 400. In FIG. 5, on the other hand, the ellipsoid container 400 is partially filled with the liquid 118, such that an expansion volume 402 is provided at the upper part of the internal chamber of the ellipsoid container 400.

FIG. 6 shows yet another embodiment of a divergence sensor 114E, in which the various sides 600, 602, 604, and 606 of the container 608 of the divergence sensor 114E are formed to have different stiffness. For example, the sides 600 and 604 can have a different stiffness than the bottom side 606. Moreover, the top side 602 can also have a different stiffness from either the sides 600, 604 or the bottom side 606. Providing different stiffness on the different sides can be accomplished by using different materials. For example, a soft rubber or latex material can have a low stiffness, while a hard rubber or plastic can have a medium stiffness. On the other hand, glass or metal will have a greater stiffness.

Moreover, as shown in FIG. 7, different stiffness can be achieved by providing different thicknesses of the same material. In FIG. 7, a divergence sensor 114F has sides 700 and 704 of smaller thickness than the top and bottom sides 702 and 706. A smaller thickness results in less stiffness, while a greater thickness results in greater stiffness.

Providing different stiffness will vary the directional sensitivity of the divergence sensor. This can be used to attenuate certain parts of the wavefields that are received by the sensor assembly 100. Making a particular side more stiff means that the divergence sensor would be more sensitive to a wavefield propagating in a direction that is generally perpendicular to the particular side.

Alternatively, as shown in FIG. 8, the container of a divergence sensor 114G may also be made out of a stiff material (802), with a less stiff area 804 provided at the bottom of the divergence sensor 114G. This divergence sensor may be placed at the surface with the less stiff area 804 in direct contact with the surface. A variation of this implementation is shown in FIG. 9, which depicts a divergence sensor 114H that has a container of the stiff material (802) that has the less stiff area 804 at the bottom. In addition, a soft pin 902 is attached to the bottom of the divergence sensor 114H, where the soft pin is for implantation into a ground surface. The soft pin 902 can be filled with a liquid, for example, or alternatively, the soft pin 902 can be formed of a softer material (softer than the material 802). In such an arrangement, pressure is transmitted through the soft liquid filled pin from the ground.

As shown in FIG. 1, the seismic sensor 112 and divergence sensor 114 are part of an overall shell or housing 101, such that the sensor assembly 100 can be considered to be a single sensor device. In an alternative embodiment, the seismic sensor 112 and divergence sensor 114 can be provided in different shells or housings, and each of the seismic sensor 112 and divergence sensor 114 can be associated with its own respective electronic circuitry, such that the sensor assembly 100 would be considered to be formed of two separate sensor devices. In such an implementation, the two separate sensor devices would be located relatively close together (such as less than one meter or some other distance apart).

Figure 10:
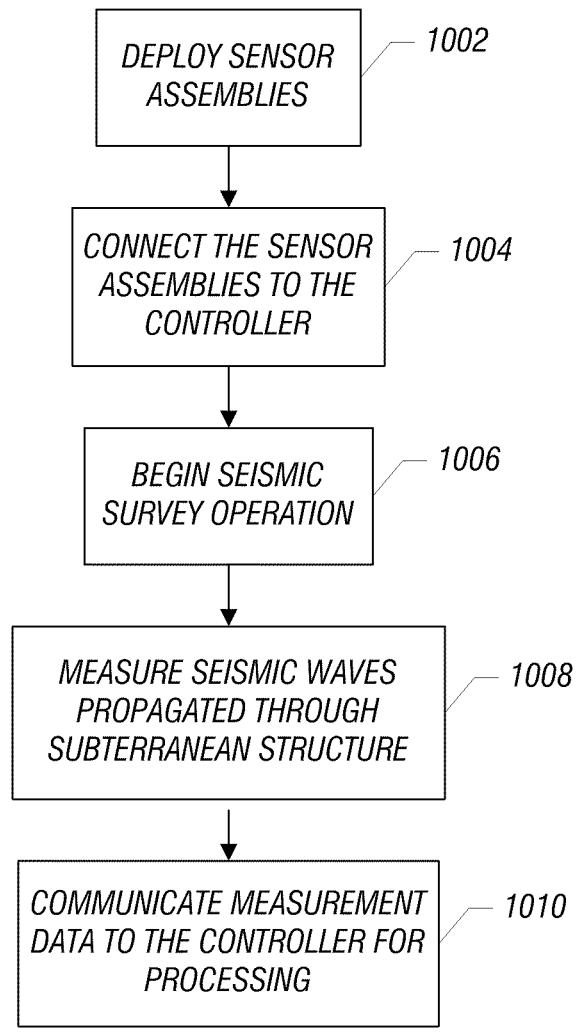
FIG. 10 is a flow diagram of a process of performing seismic surveying, according to an embodiment.

FIG. 10 illustrates a process of performing a seismic survey operation, according to an embodiment. First, sensor assemblies 100 are deployed (at 1002) in the survey field. The sensor assemblies 100 are implanted into the ground surface such that the hydrophones 120 of the sensor assemblies 100 are at or below the ground surface 117 (FIG. 1) but not above the ground surface 117. Each sensor assembly 100 may be buried through a technique that is called sandbagging. The sensor assembly 100 is placed on top of the surface or in a small hole and a bag (or sand or gel not necessarily in a bag) is placed on top of the sensor assembly 100 to keep the sensor assembly 100 in position. The bag may be filled with any suitable material including sand, stones and water.

The sensor assemblies are then connected (at 1004) to the controller 106. The connection may be accomplished by using the electrical cable 104, or by using wireless communications.

Next, seismic operation begins (at 1006), in which a seismic source, such as a vibrator or explosive, is activated to induce seismic waves into the subterranean structure 115 (FIG. 1). Seismic waves reflected from the subterranean structure 115 are measured (at 1008) by the sensor assemblies 100. The acquired data is communicated (at 1010) from the sensor assemblies 100 to the controller 106. The data that is communicated to the controller 106 includes both data acquired by seismic sensors 112 as well as data acquired by the divergence sensors 114.

The processor 108 in the controller 106 then performs processing based on the received data. For example, the processor 108 can remove noise effects by using the data from the divergence sensors 114, such that noise components are removed from the signals acquired by the seismic sensors 112.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A sensor assembly for use in surveying a subterranean structure, comprising:
 a housing containing:
  a divergence sensor for positioning at or below a ground surface above the subterranean structure, wherein the divergence sensor includes a container containing a material and a pressure sensor immersed in the material; and
  a single-component seismic sensor external to the container of the divergence sensor, the seismic sensor positioned inside the housing above the divergence sensor when the sensor assembly is implanted into the ground surface.

2. The sensor assembly of claim 1, wherein the seismic sensor comprises one of a geophone and an accelerometer.

3. The sensor assembly of claim 1, wherein the seismic sensor is to measure a vertical component of particle velocity or acceleration or displacement of a seismic wavefield.

4. The sensor assembly of claim 1, wherein an output produced from data of the seismic sensor includes one of: a measured horizontal component of particle velocity or acceleration or displacement of a seismic wavefield; and a derived horizontal component of particle velocity or acceleration or displacement of the seismic wavefield.

5. The sensor assembly of claim 1, wherein the container contains an expansion volume filled with gas or vacuum, wherein the expansion volume is adjacent the material inside the container.

6. The sensor assembly of claim 5, further comprising a bubble structure coupled to the container to provide the expansion volume filled with gas or vacuum.

7. The sensor assembly of claim 5, wherein the container is partially filled with the material to provide the expansion volume.

8. The sensor assembly of claim 1, wherein the material includes liquid.

9. The sensor assembly of claim 8, wherein the liquid is selected from the group consisting of kerosene, mineral oil, vegetable oil, silicone oil, and water.

10. The sensor assembly of claim 1, wherein the material includes a gel.

11. The sensor assembly of claim 1, wherein the material includes a solid.

12. The sensor assembly of claim 11, wherein the solid is selected from the group consisting of sand and a plastic.

13. The sensor assembly of claim 1, wherein the container has a shape selected from the group consisting of: a cuboid shape, a parallelepiped shape, a pyramid shape, a quadrilateral frustum shape, and a dipyramid shape.

14. The sensor assembly of claim 1, wherein the container is generally ellipsoid shaped or spherically shaped.

15. The sensor assembly of claim 1, further comprising a soft pin attached to a bottom portion of the container.

16. The sensor assembly of claim 1, wherein the pressure sensor comprises a hydrophone.

17. The sensor assembly of claim 1, wherein the divergence sensor is positioned to enable measurement of ground-roll noise.

18. The sensor assembly of claim 1, wherein the container has a side portion having a larger stiffness than a stiffness of a top portion and a stiffness of a bottom portion of the container, to cause greater directional sensitivity of the divergence sensor to a wavefield propagating in a direction that is generally perpendicular to the side portion.

19. The sensor assembly of claim 18, wherein the side portion is formed of a different material than each of the top portion and the bottom portion of the container to provide the larger stiffness.

20. The sensor assembly of claim 18, wherein the side portion is formed of a different thickness than each of the top portion and the bottom portion of the container to provide the larger stiffness.

21. The sensor assembly of claim 1, further comprising electronic circuitry electrically connected to the seismic sensor and the divergence sensor, the electronic circuitry including a communication component to communicate with a controller, the electronic circuitry positioned above the seismic sensor when the sensor assembly is implanted into the ground surface.

22. A method of performing seismic surveying comprising:
deploying sensor assemblies on a ground surface, wherein each of at least some of the sensor assemblies has a housing containing a seismic sensor and a divergence sensor, wherein the divergence sensor has a container containing a material and a pressure sensor immersed in the material, and wherein the seismic sensor is located above and external to the container of the divergence sensor;
measuring waves by the seismic sensors and divergence sensors, where the divergence sensors are to measure ground-roll noise and wherein data from the divergence sensors is for use to attenuate the ground-roll noise in data acquired by the seismic sensors.

23. The method of claim 22, wherein the waves measured by the divergence sensors comprise waves traveling generally horizontally.

24. The method of claim 22, wherein each of the containers is partially filled with the material to provide an expansion volume for the material.

25. The method of claim 22, further comprising arranging different sides of at least a particular one of the containers to have different stiffness, wherein a side portion of the particular container has a stiffness larger than a stiffness of a top portion and a stiffness of a bottom portion of the particular container, to cause greater directional sensitivity of the corresponding divergence sensor to a wavefield propagating in a horizontal direction that is generally perpendicular to the side portion.

26. The method of claim 22, wherein each of the at least some of the sensor assemblies further comprises electronic circuitry electrically connected to the seismic sensor and the divergence sensor, the electronic circuitry positioned above the seismic sensor when the respective sensor assembly is implanted into the ground surface, the method further comprising:
communicating between a communication component of the electronic circuitry of each of the at least some sensor assemblies and a controller separate from the at least some sensor assemblies.

27. A system comprising:
an arrangement of sensor assemblies for provision on a ground surface, wherein at least a given sensor assembly of the sensor assemblies comprises:
a housing containing:
a divergence sensor for positioning at or below a ground surface above a subterranean structure, wherein the divergence sensor includes a container containing a material and a pressure sensor immersed in the material; and
a single-component seismic sensor external to the container of the divergence sensor, the seismic sensor positioned inside the housing above the divergence sensor when the given sensor assembly is implanted into the ground surface.

28. The system of claim 27, wherein the divergence sensor and seismic sensor are physically separated.

29. The system of claim 27, further comprising a controller to:
receive data acquired by the seismic sensor;
receive data representing ground-roll noise acquired by the divergence sensor; and
use the data acquired by the divergence sensor to attenuate the ground-roll noise in the data acquired by the seismic sensor.

30. The system of claim 27, wherein the divergence sensor is positioned to enable measurement of ground-roll noise.

31. The system of claim 27, wherein the container has a side portion having a larger stiffness than a stiffness of a top portion and a stiffness of a bottom portion of the container, to cause greater directional sensitivity of the divergence sensor to a wavefield propagating in a direction that is generally perpendicular to the side portion.

32. The system of claim 27, wherein the given sensor assembly further comprises electronic circuitry electrically connected to the seismic sensor and the divergence sensor, the electronic circuitry including a communication component to communicate with a controller separate from the given sensor assembly, and the electronic circuitry positioned above the seismic sensor when the sensor assembly is implanted into the ground surface.

* * * * *